W. R. SCHÜRMANN.
Changing Speed.
No. 206,621. Patented July 30, 1878.
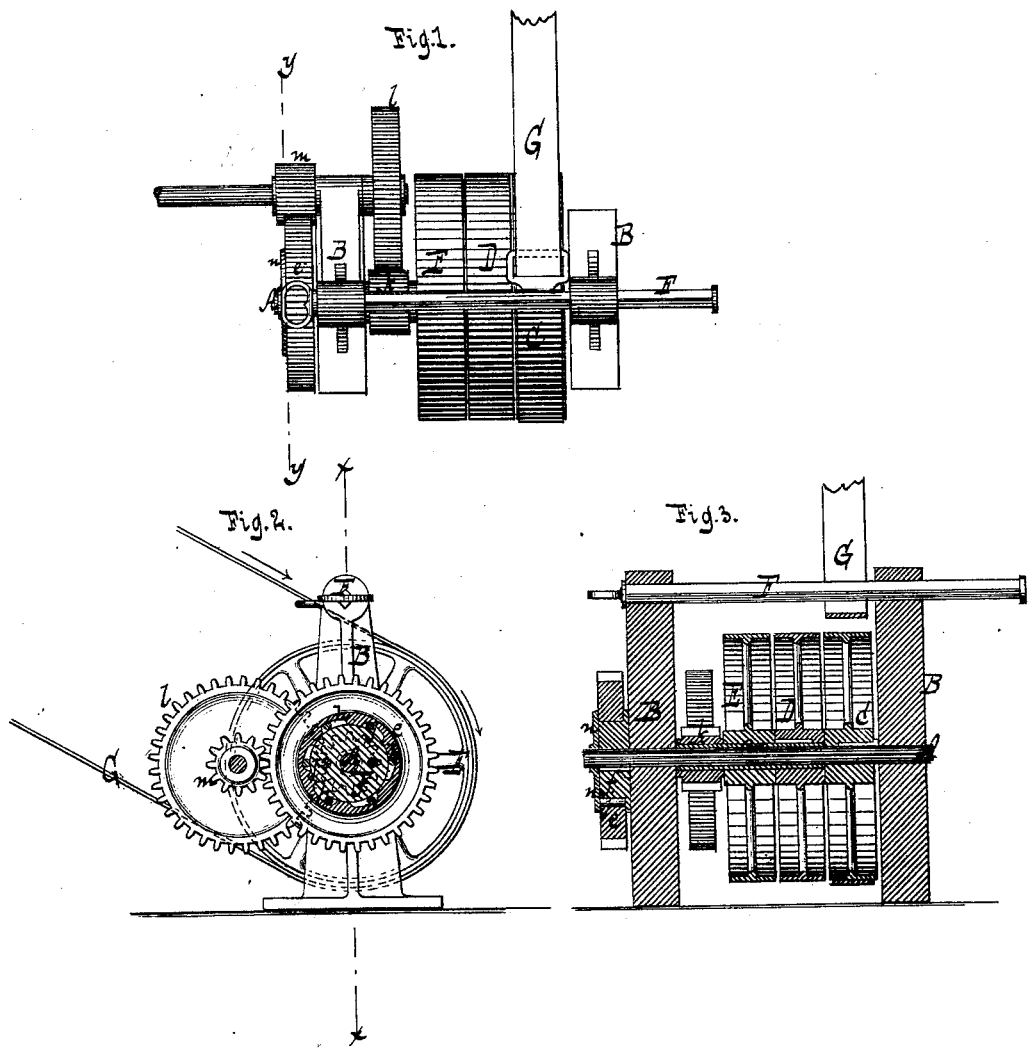
Witnesses
Otto Hufeland
W. C. Hauff
Inventor.
Wilhelm R. Schürmann
by
Van Santvoord & Hauff
his attorneys.

UNITED STATES PATENT OFFICE.

WILHELM R. SCHÜRMANN, OF DUSSELDORF, PRUSSIA.

IMPROVEMENT IN CHANGING SPEED.

Specification forming part of Letters Patent No. 206,621, dated July 30, 1878; application filed July 10, 1878.

*To all whom it may concern:*

Be it known that I, WILHELM R. SCHÜRMANN, of Dusseldorf, Prussia, have invented a new and useful Improvement in Transmitting Motion, which invention is fully set forth in the following specification, reference being had to the accompanying drawing, in which—

Figure 1 is a plan view. Fig. 2 is a section on the plane $y\,y$, Fig. 1. Fig. 3 is a section on the plane $x\,x$, Fig. 2.

This invention consists in the combination, with the several transmitting-gears of a compound apparatus for transmitting motion with variable speed, of separate clutches, one for each gear, so that when one driving-pulley is set in motion it is not compelled to turn all the other driving-pulleys, thus preventing waste of power and unnecessary wear of bearings.

In the drawing, the letter A designates an axle or shaft running in standards B B. To this axle A is firmly keyed a pulley, C. On the shaft A is a sleeve, $a$, Fig. 3, which extends part of the length of the shaft A, and turns loosely on said shaft A. To this sleeve $a$ is also keyed a pulley, D. There may also be a sleeve turning on the sleeve $a$, and extending part of its length, and having a pulley keyed to it, and so on to any desired number of pulleys. E is simply a loose pulley, onto which the belt G is slid by means of the belt-shipper F when the machine is to stop running.

When the belt G is brought to the pulley C, it causes said pulley to revolve in the direction of the arrow, Fig. 2, and the axle A is caused to revolve in the same direction. To the axle A is keyed a disk, $f$, Figs. 2 and 3. On this disk $f$ turns the wheel $e$, which wheel has tapering slots $h$ around its central opening. In each of these slots there is a small bar or roller, $j$, of metal or any suitable material, which roller rests on the periphery of the disk $f$. Said rollers $j$ are prevented from slipping out by means of a disk, $n$, Fig. 1, which is held on the disk $f$ by means of screws. If the axle A and disk $f$ revolve in the direction of the arrow, Fig. 2, these bars or rollers $j\,j$ are carried toward the narrow part of the slots $h\,h$, and, by being jammed in, cause the wheel $e$ to revolve. Of course, any desired form of clutch arrangement may be substituted which will accomplish the object of said friction-clutch, which object will presently be explained.

The pulley C, being revolved by the belt G, causes the wheel $e$ to revolve, as already explained. This wheel may connect with other wheels, or may be made to transmit the motion it receives in any desired manner.

If the belt is slipped onto the pulley D, said pulley is caused to revolve, together with the sleeve $a$, to which said pulley D is keyed. On this sleeve $a$ is a gear, $k$, which gear is connected by a train of gears, $l\ m$, with the wheel $e$, which is thus caused to revolve. According to the train of gears here employed, the movement of the wheel $e$ is faster or slower, as the case may be, than when the pulley C was revolving.

Furthermore, the wheel $e$ revolving in the direction opposite to the arrow, Fig. 2, it will be seen that the rolls $j$ are carried into the deepest part of the slots $h$, and thus the disk $f$ and axle A, together with the pulley C, which is keyed onto said axle A, remain stationary, while the wheel $e$ is free to revolve. By this means pulleys which are not used remain stationary, thus preventing any waste of power. The object of the clutch arrrangement thus becomes apparent.

By thus providing a series of pulley-wheels imparting motion to suitable trains of gears, the resultant motion of a machine can be varied instantly by simply slipping the driving-belt from one pulley onto another.

Of course I do not limit myself to gears in transmitting motion, since belts might also be used; but I prefer gears, since they are more reliable.

What I claim as new, and desire to secure by Letters Patent, is—

1. The combination, with the several transmitting-gears of a compound apparatus, substantially as described, for transmitting motion with variable speed, of separate clutches, one for each gear, substantially as and for the purpose set forth.

2. The combination, with the shaft A, fixed pulley C, sleeve a, and its attached pulley D and gear k, of the gears l m and gear e, provided with a clutch, allowing it to turn loosely in one direction, but causing it to engage with the shaft A when turned in the opposite direction, substantially as described.

W. R. SCHÜRMANN.

Witnesses:
  LEO CARRER,
  TH. GESEMANN.